United States Patent
Shiraogawa et al.

(10) Patent No.: US 7,248,895 B2
(45) Date of Patent: Jul. 24, 2007

(54) CONTROLLING SETTINGS FOR MOBILE TELECOMMUNICATIONS APPARATUS

(75) Inventors: Ako Shiraogawa, Singapore (SG); Esa Pollari, Singapore (SG)

(73) Assignee: Nokia Corporation, Espoo (FI)

( * ) Notice: Subject to any disclaimer, the term of this patent is extended or adjusted under 35 U.S.C. 154(b) by 685 days.

(21) Appl. No.: 10/461,660

(22) Filed: Jun. 12, 2003

(65) Prior Publication Data
US 2004/0253975 A1     Dec. 16, 2004

(51) Int. Cl.
H04B 1/38    (2006.01)
H04M 1/00   (2006.01)

(52) U.S. Cl. .................. 455/557; 455/419; 455/550.1; 455/558

(58) Field of Classification Search ............. 455/414.3, 455/414.1, 418, 419, 422.1, 426.1, 435.1, 455/432.3, 435.2, 456.6, 550.1, 557, 558, 455/552.1, 553.1, 414.2, 434, 446, 556.1, 455/556.2
See application file for complete search history.

(56) References Cited

U.S. PATENT DOCUMENTS 6,125,282 A  *  9/2000 Urabe .................... 455/552.1
6,470,496 B1    10/2002 Kato et al. ................... 717/173
6,622,017 B1 *  9/2003 Hoffman ...................... 455/419
2002/0072369 A1 *  6/2002 Sasada et al. ............... 455/435
2003/0022689 A1 *  1/2003 McElwain et al. .......... 455/551

FOREIGN PATENT DOCUMENTS

EP    0943989 A2    9/1999
EP    1098247 A2    5/2001

* cited by examiner

Primary Examiner—Edward F. Urban
Assistant Examiner—John J. Lee
(74) Attorney, Agent, or Firm—Harrington & Smith, PC

(57) ABSTRACT

A mobile telecommunications apparatus (1) is initialised with settings for use with one of a plurality of different operator networks. The apparatus, such as a mobile telephone handset has a micro-controller (12) with an associated non-volatile memory (13) that is pre-loaded with data comprising a plurality of variant packs (VP) for controlling the settings of the apparatus for use with individual networks. The handset also receives a subscriber identity device (SIM 9) that carries network identity data corresponding to the network to be used by the subscriber. The micro-controller (12) performs an initialisation procedure when the SIM is fitted to a receptor (10), to select at least one of the variant packs (VP) in dependence upon the network identity data from the SIM, and to set the settings of the apparatus in accordance with the data from the selected variant packs. The non-selected packs are not revealed to the subscriber.

27 Claims, 3 Drawing Sheets

CONTROLLING SETTINGS FOR MOBILE TELECOMMUNICATIONS APPARATUS

FIELD OF THE INVENTION

This invention relates to mobile telecommunications apparatus, for being initialised with settings for use with one of a plurality of different operator networks.

BACKGROUND

As well known in the art, particular settings are required for a mobile telecommunications apparatus to allow access to individual services such as messaging and data services. For example, with a telephone handset for a network such as GSM, particular settings need to be made to access wireless application protocol (WAP), general packet radio service (GPRS) multimedia messaging services (MMS) and email, and the settings are different for each network. Some network providers offer some services and not others. Further examples of services that require individual settings are instant messaging (IM) and presence enhanced contacts (PEC).

Usually, the seller of the handset enters the particular settings manually at the time that a user of the handset becomes a subscriber for a particular network, or the subscriber may provided with data to allow manual entry of the settings. Also, the settings can be downloaded to the handset over the air, for example in a short message service (SMS) communication.

A problem with the prior approach is that each network operator may have its own settings, which requires them to be set up individually on each handset. If the settings were pre-loaded before the handset is sold to a subscriber, then a large number of settings would need to be stored, which would use up large amounts of memory and would require the user to carry out a complicated selection procedure to scroll through and find the settings for a particular network. Furthermore, individual network operators are reluctant to have their competitors' settings pre-loaded into the handset.

Thus, hitherto, when a handset is commissioned by a seller or by the user, a subscriber identity device is inserted into the handset and thereafter, the settings are loaded manually so as to provide access to services provided on the network chosen by the subscriber such as WAP, GPRS, MMS, IM, PEC and email. However, this is laborious and time consuming.

The present invention provides an improved way of initialising a mobile telecommunications apparatus with settings for a particular operator network. which overcomes these problems and disadvantages.

SUMMARY OF THE INVENTION

According to the invention the mobile telecommunications apparatus has a memory pre-loaded with data comprising a plurality of variant packs for controlling the settings of the apparatus for use with individual networks, a receptor to receive a subscriber identity device that carries network identity data corresponding to the network to be used by the subscriber, and a processor operable to perform an initialisation procedure when the subscriber identity device is fitted to the receptor, to select at least one of the variant packs in dependence upon the network identity data from the subscriber identity device, and to set the settings of the apparatus in accordance with the data from the selected one of the variant packs.

The variant packs may be provided in the memory at the time of manufacture or commissioning of the apparatus. Also, the processor may operable to load variant packs into the unreserved area of the memory for use in the initialisation procedure. The variant packs may for example be received by over-the-air programming in the field after the apparatus has been commissioned, as a short message communication. The memory may have reserved and unreserved storage areas, subscriber-selected data such as an address book being storable by the user in the unreserved storage area. One or more of the variant packs may be stored in the unreserved area and can be subsequently overwritten with subscriber-selected data. Thus, many variant packs can be included in the memory initially and then overwritten when no longer needed, or updated.

The processor preferably is configured to set the settings in accordance with the data from the selected one of the variant packs without revealing data corresponding to non-selected packs to the subscriber. Thus, the conflicting requirements of different network operators can met whilst storing different operator settings in the memory.

Each of the variant packs may include pack identity data corresponding to the network to which the pack relates, and the processor may be configured to determine the network identity data from the subscriber identity device and compare the network identity data with the pack identity data to determine which of the packs contain settings corresponding to the network for the subscriber.

The processor may be configured to store content data corresponding to the network settings at memory locations specified by destination data corresponding to memory locations where the content data is to be stored. The content data may be stored as a plurality of data objects with corresponding destination data.

For example, the memory may include regions containing system settings and user settings, and the processor may be operable to set the settings in at least one of the system settings and the user settings in accordance with the selected one of the variant packs.

Many different settings may be set according to the invention, such as: applications settings for WAP, GPRS, MMS, IM, PEC, and e-mail, operator-specific commands and service numbers for requesting applications settings over-the-air by SMS, operator menus, bookmarks, operator logos, wallpapers, screensavers, SIM lock, product profiles and executable code.

The subscriber identity device may comprise a smart card such as a SIM, USIM and R-UIM.

The invention also includes a method of initialising the mobile telecommunications apparatus for use with one of a plurality of different operator networks, comprising fitting the subscriber identity device to the receptor, and causing the processor to perform an initialisation procedure to select one of the variant packs in dependence upon the network identity data from the subscriber identity device, and to set the settings of the apparatus in accordance with the data from the selected one of the variant packs.

The initialisation procedure may be performed on a first occurrence when the apparatus is first supplied to a user subscribing to a first network and thereafter on a second occurrence when the user subscribes to a different network using a different subscriber identity device.

BRIEF DESCRIPTION OF THE DRAWINGS

In order that the invention may be more fully understood an embodiment thereof will now be described by way of example with reference to the accompanying drawings in which.

DETAILED DESCRIPTION

Figure 1:
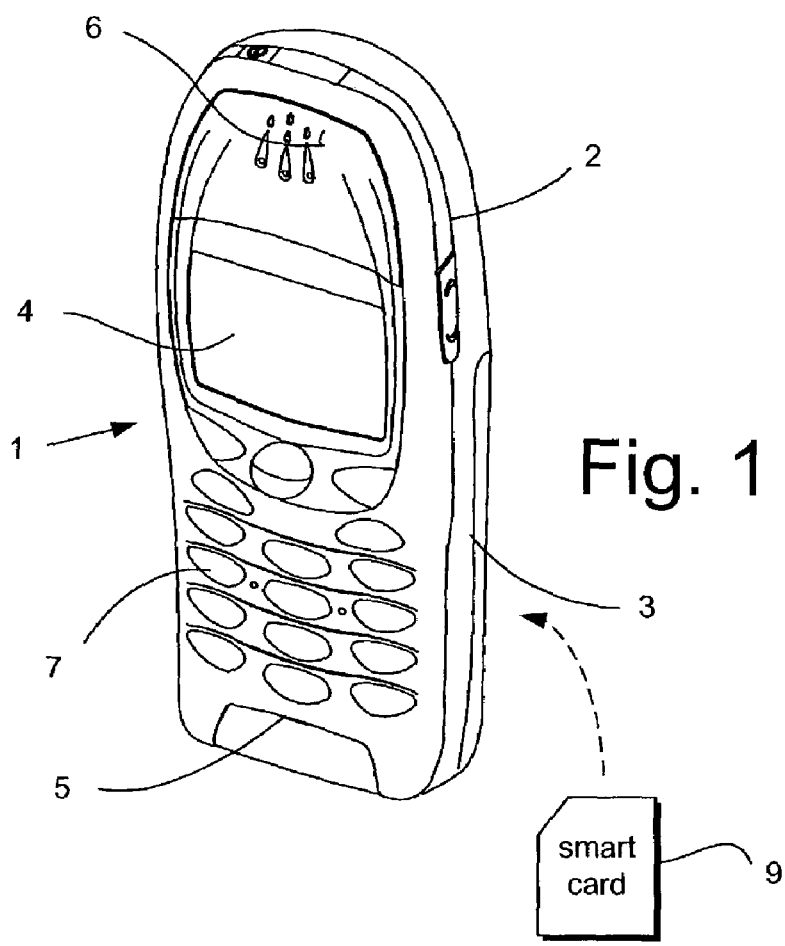
FIG. 1 is a schematic perspective view of a mobile telephone handset.
Figure 2:
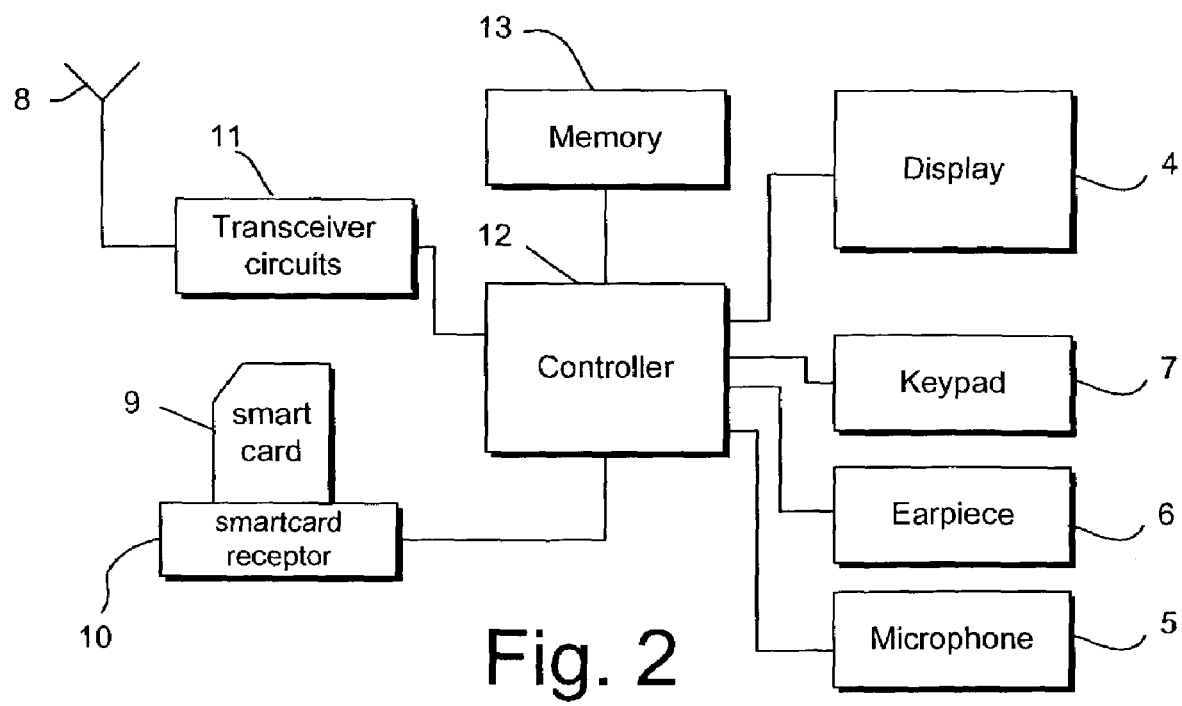
FIG. 2 is a schematic block diagram of the circuits of the handset.

Referring to FIGS. 1 and 2, a mobile telephone handset 1 comprises a case 2, a battery 3, a liquid crystal display (LCD) panel 4, a microphone 5, an earpiece 6, a keypad 7, antenna 8, a subscriber identity device in the form of a smart card 9 such as a subscriber identification module (SIM) card and a smart card receptor 10 that provides electrical connections to the smart card 9. The mobile telephone circuitry includes a radio transceiver circuits 11, a micro-controller 12 in the form of a microprocessor and a memory 13 which includes non-volatile or persistent memory as well known in the art, as well as volatile memory (not shown).

In use, the handset can be used for voice communication in a conventional manner using the microphone and earpiece 5, 6 and the keyboard 7. Voice signals are sent from the microphone 5 by the controller 12 to the transceiver circuits 11 for onward transmission via antenna 8 and receive signals are decoded by the transceiver circuits 11 and fed via micro-controller 12 to the earpiece 6. Calls are controlled by the use of the keyboard and a display of data relating to the call can be provided on display 4 under the control of micro-controller 12.

The handset 1 can also be used for data communication such as SMS, WAP and email. The availability of these services varies from network operator to network operator and in order to access these and other such services, particular settings need to be loaded into the memory 13, such as dial up numbers, web addresses password codes and the like.

Figure 3:
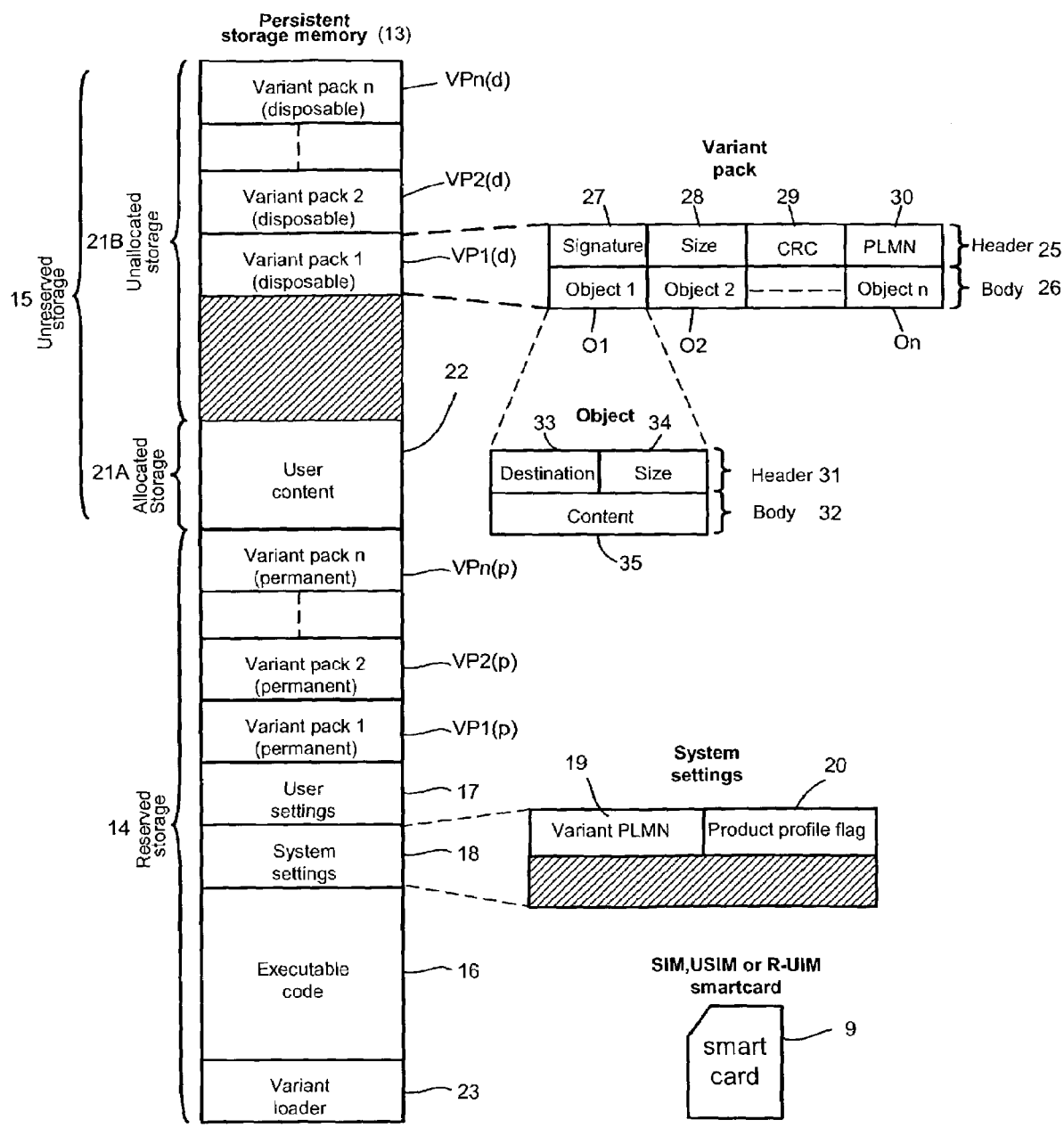
FIG. 3 is a schematic illustration of the organisation of the memory of the handset.

The organisation of the memory 13 is shown in FIG. 3. The non-volatile memory is arranged in reserved and non-reserved storage areas 14, 15. The reserved storage area contains permanently loaded data for the micro-controller 12 including executable code 16 to allow calls to be made and received together with the usual housekeeping functions associated with the handset. The reserved storage 14 also includes user settings 17 and system settings 18. The system settings 18 contain the settings for network services that are currently enabled on the handset. This may be indicated by a variant PLMN flag 19, which is set to a particular value indicating the settings for a particular public land mobile network (PLMN) that have been set in the memory. The system settings may also include a number of product profile flags 20 which indicate whether particular services should be made available to the subscriber on the handset. For example, the network operator of a particular PLMN may not provide SMS Email i.e. SMS and Internet electronic mail interworking according to the ETSI Recommendation GSM 03.40. In this case, the corresponding product profile flag is set so that the micro-controller 12 disables SMS Email menu options from being displayed on the display 4. Conversely if the particular service is available, the product profile flag is set to a value that enables the controller 12 to provide an appropriate service display.

Considering the unreserved storage area 15, it contains an allocated storage area 21A and an unallocated area 21B. The allocated storage area 21A may contain user content 22, for example an address book with telephone numbers and other details such as email addresses that have been loaded manually by the subscriber into the memory or have been downloaded through the network. Since the user content 22 is stored in unreserved storage, it can be modified and updated by the subscriber over time.

According to the invention, a variant loader 23 is held in the memory 13, which comprises code executable by the controller 12 to load one of more variant packs VP1$p$—VPn$p$; VP1$d$—VPn$d$. The variant packs VP1$p$—VPn$p$ are loaded in the reserved storage 14 on a permanent basis whereas the variant packs VP1—VPn$d$ are loaded in the unreserved storage 15 and can be overwritten by the subscriber with additional user content, over time. The variant packs VP1—VPn$d$ can be loaded in the unreserved storage 15 at the time of manufacture or commissioning of the handset and may be loaded by over-the-air programming either at the time of commissioning or later in the field by the subscriber. Thus, the variant packs VP$d$ in the unreserved storage 15 can be updated over time if required, as will be explained in more detail hereinafter. The variant packs VP contain settings suitable for individual network operators and in accordance with the invention, the variant loader 23 selects one or more of the variant packs VP depending on the network to be used by the subscriber. The subscriber's home network is determined from the smart card 9. The data from the selected variant pack(s) VP are used to set the user settings and/or the system settings 17, 18 for the handset, to be appropriate for the particular network for the subscriber.

The structure of variant pack VP1$d$ is illustrated by way of example. The variant pack includes a header 25 and a body 26. The header contains a signature field 27 which is common to all variant packs, together with a field 28 that comprises a size parameter indicative of the size of the variant pack. Field 29 contains a cyclic redundancy code for error checking purposes. Field 30 contains variant pack identity data corresponding to the PLMN to which the variant pack relates.

The body 26 of the variant pack contains data objects O1-On that comprise the setting data for the PLMN.

Each object itself comprises a header 31 and body 32. The header 31 contains a destination parameter 33 which indicates where the object is to be stored in the system settings 18, and a size parameter 34 indicative of the data size. The body 32 contains content 35 to be written into the system settings 18 at the destination indicated by destination parameter 33.

The smart card 9 is also shown in FIG. 3 which, as well known in the art includes data corresponding to the identity of the subscriber together with details of their home PLMN (HPLMN).

Figure 4:
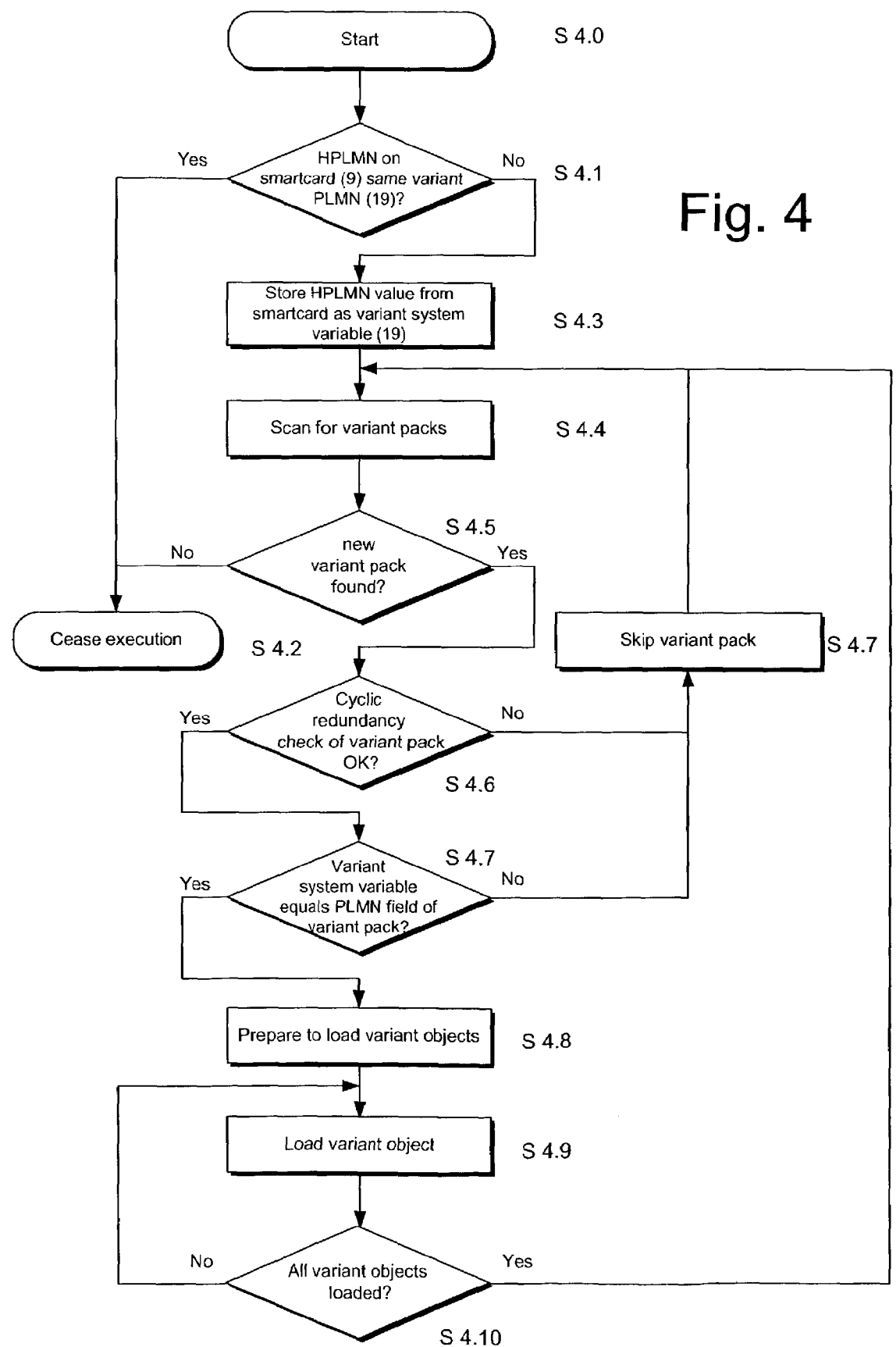
FIG. 4 is a schematic flow diagram of an initialisation procedure carried out by the controller of the handset to install settings appropriate for a particular network operator.

Referring to FIG. 4, when the smart card 9 is inserted into the smart card receptor 10 of the handset, the variant loader 23 performs an initialisation process to set the system settings 18 according to data from one or more of the variant packs VP that relate to the HPLMN indicated on smart card 9.

The process starts at step S4.0 and at step S4.1, a check is made to determine if the HPLMN indicated on the smart card 9 is the same as the variant PLMN flag 19 set in the system settings 18. If they are the same, then the system settings are correctly set for the subscriber's HPLMN and no further action is needed. The initialisation process then ceases at step S4.2.

However, if the variant PLMN flag 19 does not denote the same HPLMN as the smart card 9, then system settings need to be updated to correspond to the HPLMN for the subscriber. At step S4.3, the HPLMN value from the smart card 9 is stored as the variant PLMN flag 19. Then, at step S4.4, a scan is carried out through the persistent memory 13 for all variant packs both in the reserved and unreserved storage areas 14, 15. Variant packs are located by their common signature 27.

When a new variant pack is found at step S4.5, its integrity is checked by performing a cyclic redundancy check on the basis of the cyclic redundancy code 29, as shown at step S4.6. If the variant pack fails the cyclic redundancy test, it is skipped at step S4.7 and the scanning process for further variant packs continued at step S4.4. However, if the cyclic redundancy check is satisfactory, a test is performed at step S4.7 to determine whether the variant pack is relevant to the HPLMN. This is performed by determining whether the PLMN indicated by the variant pack identity data 30 is the same as the currently set PLMN field 19 in the system settings 18. If it is not the same, the variant pack under consideration is skipped at step S4.7 and the scan for other variant packs continues at step S4.4.

However, if the variant pack under consideration at step S4.7 corresponds to the HPLMN at step S4.7, the data from the variant pack is loaded into the system settings 18, object by object. At step S4.8, the loader 23 in combination with the micro-controller 12 prepares to load the first object of the variant pack VP. The content 35 of the object is copied to a memory location indicated by the destination parameter 33. For example, the memory location could be that of the product profile flag 20 which indicates whether or not the specific application should be hidden from the subscriber on the display 4. The loading of the object is shown at step S4.9 in FIG. 4.

A check is made at step S4.10 to determine whether all objects have been loaded and if not, the procedure runs in a loop until all objects of the variant pack have been loaded successfully. Then, the procedure returns to step S4.4 to scan for further variant packs.

When all variant packs have been successfully loaded and no new packs are found at step S4.5, the procedure terminates at step S4.2.

Thus, in accordance with the invention, the memory 13 of the mobile handset can be pre-loaded with variant packs before it is supplied to the subscriber and the act of inserting the subscriber identity device 9 automatically selects the settings from the variant packs appropriate to the subscriber's home network. None of the settings need be displayed to the subscriber and none of the unused variant packs relating to competitor's networks are displayed.

Initially, at the time of commissioning the handset, the unreserved storage area of memory 13 does not contain user content 22 to any significant extent but as the subscriber builds up an address book or other user content data 22, the variant packs VPd in the unreserved storage 15 become overwritten with new user data. However, since these variant packs are either not needed or have been used during the initialisation process, the packs can be safely overwritten.

Furthermore, if the user later decides to subscribe to a different network i.e. a different HPLMN, the initialisation process can be run for a second time when a replacement smart card for the new HPLMN is inserted. This may make use of a variant pack VPp in the reserved storage area 14 and/or variant packs VPd from the unreserved storage area 15 if they have not been overwritten with user content. Also, if needed, additional variant packs VPd appropriate to the new HPLMN may be downloaded by over-the-air programming, to replace any overwritten packs and also to provide any relevant updates for the settings for the new HPLMN as compared with the variant packs that were loaded at the time of commissioning the handset. Such downloads may be manually requested by the subscriber and sent as a SMS and loaded as a new variant pack e.g. VP(n+1)d into the unreserved storage area 15. The variant loader 23 will then load the setting data from the pack VP(n+1)d as previously described.

It will be understood that the invention may be used with any suitable mobile network protocol, for example GSM, CDMA or a third generation network using wideband CDMA. It will be appreciated that the smart card 9 may comprise a subscriber identity module (SIM), USIM or R-UIM or any other subscriber identity device from which the HPLMN can be deduced.

The variant packs may contain a wide range of different customisation settings for example, but not limited to the following:

applications settings for WAP, GPRS, MMS, IM, PEC, and e-mail;
operator-specific commands and service numbers needed for requesting applications settings over-the-air by SMS;
operator menus and bookmarks;
operator logos, wallpapers or screensavers;
SIM lock;
product profiles;
executable code that implements enhanced functionality that is not provided for in the standard device firmware.

Thus, the data from the selected variant packs may be loaded not only into the user settings 17 and the system settings 18, but also into other memory locations such as the executable code 16 and the user content 22.

Changes and updates can be accommodated by over-the-air programming of new or updated variant packs, which may be supplied by a network operator, for example when new services are introduced, for example into the HLPMN. In this situation, a new variant pack may be downloaded to the handset, for example as a SMS, and loaded as a new variant pack VP(n+1)d into the unreserved storage area 15. The subscriber may be provided with a prompt to run the variant loader 23 so that a product profile flag or other setting is updated in accordance with the data contained in the downloaded variant pack VP(n+1)d.

In accordance with the invention, the crucial, mission critical customisation settings can be separated from the non-crucial ones. Crucial customisation settings such as product profiles and executable code are stored in variant packs VPp in the reserved storage area 14 whereas non-crucial settings can be stored in the variant packs VPd in the unreserved storage area 15.

Many other modifications, variations and equivalents will be evident to those skilled in the art. For example, the invention may be applied not only to mobile telecommunication handsets but to other mobile apparatus that makes use of wireless communications network such as a personal digital assistant (PDA) or laptop computer.

The invention claimed is:

1. A mobile telecommunications apparatus to be initialized with settings for use with one of a plurality of different operator networks for a subscriber thereto, comprising:

a memory pre-loaded with data comprising a plurality of variant packs configured to control the settings of the apparatus for use with individual ones of the networks, a receptor configured to receive a subscriber identity device that carries network identity data corresponding to the network to be used by the subscriber, and a processor configured to perform an initialization procedure when said subscriber identity device is fitted to the receptor, to select at least one of the variant packs in dependence upon the network identity data from the subscriber identity device, and to set the settings of the apparatus in accordance with the data from the selected one of the variant packs, wherein each of the variant packs include pack identity data corresponding to the network to which the pack relates, and the processor is further configured to determine the network identity data from the subscriber identity device and compare the network identity data with the pack identity data to determine which of the packs contain settings corresponding to the network for the subscriber.

2. The mobile telecommunications apparatus as claimed in claim 1 wherein said memory comprises reserved and unreserved storage areas, the processor being controllable to store subscriber-selected data in the unreserved storage area wherein at least one of said variant packs are stored in the unreserved area and can be subsequently overwritten with subscriber-selected data.

3. The mobile telecommunications apparatus as claimed in claim 1 wherein the processor is further configured to load variant packs into the unreserved area of the memory for use in said initialization procedure.

4. The mobile telecommunications apparatus as claimed in claim 1 wherein the processor is further configured to load variant packs into the memory, received by over-the-air programming.

5. The mobile telecommunications apparatus as claimed in claim 1 wherein the memory includes regions containing system settings and user settings, and the processor is further configured to set the settings in at least one of the system settings and the user settings in accordance with the selected one of the variant packs.

6. The mobile telecommunications apparatus as claimed in claim 1 wherein the processor is configured to set the settings in accordance with the data from the selected one of the variant packs without revealing data corresponding to non-selected packs to the subscriber.

7. The mobile telecommunications apparatus as claimed in claim 1 wherein the settings are from the group comprising: applications settings for WAP, GPRS, MIMS, IM, PEC, and e-mail.

8. The mobile telecommunications apparatus as claimed in claim 1 wherein the subscriber identity device comprises a smart card.

9. The mobile telecommunications apparatus as claimed in claim 8 wherein the smart card comprises one of a SIM, USIM or R-UIM.

10. The mobile telecommunications apparatus as claimed in claim 1 and comprising a mobile cellular mobile telecommunications handset.

11. A mobile telecommunications apparatus to be initialized with settings for use with one of a plurality of different operator networks for a subscriber thereto, comprising:

a memory pre-loaded with data comprising a plurality of variant packs configured to control the settings of the apparatus for use with individual ones of the networks, a receptor configured to receive a subscriber identity device that carries network identity data corresponding to the network to be used by the subscriber, and a processor configured to perform an initialization procedure when said subscriber identity device is fitted to the receptor, to select at least one of the variant packs in dependence upon the network identity data from the subscriber identity device, and to set the settings of the apparatus in accordance with the data from the selected one of the variant packs, wherein the variant packs include content data corresponding to network settings and destination data corresponding to memory locations where the content data is to be stored, and the processor is configured to store the content data at the memory locations specified by the destination data.

12. The mobile telecommunications apparatus as claimed in claim 11 wherein the content data is stored as a plurality of data objects with corresponding destination data.

13. A mobile telecommunications apparatus to be initialized with settings for use with one of a plurality of different operator networks for a subscriber thereto, comprising:

a memory pre-loaded with data comprising a plurality of variant packs configured to control the settings of the apparatus for use with individual ones of the networks, a receptor configured to receive a subscriber identity device that carries network identity data corresponding to the network to be used by the subscriber, and a processor configured to perform an initialization procedure when said subscriber identity device is fitted to the receptor, to select at least one of the variant packs in dependence upon the network identity data from the subscriber identity device, and to set the settings of the apparatus in accordance with the data from the selected one of the variant packs, wherein the settings are from the group comprising: operator-specific commands and service numbers for requesting applications settings over-the-air by SMS, operator menus, bookmarks, operator logos, wallpapers, screensavers, SIM lock, product profiles and executable code.

14. A method of initializing a mobile telecommunications apparatus for use with one of a plurality of different operator networks, the apparatus comprising a memory pre-loaded with data comprising a plurality of variant packs configured to control the settings of the apparatus for use with individual ones of the networks, a receptor configured to receive a subscriber identity device that also includes network identity data corresponding to the network to be used by the subscriber, and a processor, the method comprising:

with the subscriber identity device fitted to the receptor, causing the processor to perform an initialization procedure to select one of the variant packs in dependence upon the network identity data from the subscriber identity device, and to set the settings of the apparatus in accordance with the data from the selected one of the variant packs, wherein each of the variant packs include pack identity data corresponding to the network to which the pack relates, and including determining the network identity data from the subscriber identity device and comparing the network identity data with the pack identity data to determine which of the packs contain settings corresponding to the network for the subscriber.

15. The method of claim 14 including fitting the subscriber identity device to the receptor and thereby causing the processor to perform the initialization procedure.

16. The method as claimed in claim 14 including loading the variant packs into the memory.

17. The method as claimed in claim 14 including loading the variant packs at a time selected from the group comprising the time of manufacture, commissioning and in the field after commissioning.

18. The method of claim 14 wherein said memory comprises a reserved storage area that cannot be overwritten with subscriber-selected data, and an unreserved storage area that can be so overwritten, including storing at least one of the variant packs in the unreserved storage region.

19. The method of claim 18 including storing at least one of the variant packs in the unreserved storage region.

20. The method of claim 19 including receiving a variant pack over the air and loading it into the memory.

21. The method of claim 14 wherein the memory includes regions containing system settings and user settings, and including setting the settings in at least one of the system settings and the user settings in accordance with the selected one of the variant packs.

22. The method of claim 14 including setting the settings in accordance with the data from the selected one of the variant packs without revealing data corresponding to non-selected packs to the subscriber.

23. The method of claim 14 including performing the initialization procedure on a first occurrence when the apparatus is first supplied to a user subscribing to a first network and thereafter on a second occurrence when the user subscribes to a different network using a different identity device.

24. A mobile telecommunications apparatus with settings that have been set by a method as claimed in claim 14.

25. A method of initializing a mobile telecommunications apparatus for use with one of a plurality of different operator networks, the apparatus comprising a memory pre-loaded with data comprising a plurality of variant packs configured to control the settings of the apparatus for use with individual ones of the networks, a receptor configured to receive a subscriber identity device that also includes network identity data corresponding to the network to be used by the subscriber, and a processor, the method comprising:

with the subscriber identity device fitted to the receptor, causing the processor to perform an initialization procedure to select one of the variant packs in dependence upon the network identity data from the subscriber identity device, and to set the settings of the apparatus in accordance with the data from the selected one of the variant packs, wherein the variant packs include content data corresponding to network settings and destination data corresponding to memory locations where the content data is to be stored, and including storing the content data at the memory locations specified by the destination data.

26. The method of claim 25 wherein the content data is stored as a plurality of data objects with corresponding destination data, and including loading the objects into the memory successively.

27. A computer readable medium that stores a computer program to be run by a processor to initialize a mobile telecommunications apparatus for use with one of a plurality of different operator networks, the apparatus comprising a memory pre-loaded with data comprising a plurality of variant packs configured to control the settings of the apparatus for use with individual ones of the networks, a receptor configured to receive a subscriber identity device that also includes network identity data corresponding to the network to be used by the subscriber, and a processor, wherein the computer program is configured, on fitting the subscriber identity device to the receptor to:

cause the processor to perform an initialization procedure to select one of the variant packs in dependence upon the network identity data from the subscriber identity device, and to set the settings of the apparatus in accordance with the data from the selected one of the variant packs, wherein each of the variant packs include pack identity data corresponding to the network to which the pack relates, and including determining the network identity data from the subscriber identity device and comparing the network identity data with the pack identity data to determine which of the packs contain settings corresponding to the network for the subscriber.

* * * * *

UNITED STATES PATENT AND TRADEMARK OFFICE
CERTIFICATE OF CORRECTION

PATENT NO. : 7,248,895 B2 Page 1 of 1
APPLICATION NO. : 10/461660
DATED : July 24, 2007
INVENTOR(S) : Shiraogawa et al.

It is certified that error appears in the above-identified patent and that said Letters Patent is hereby corrected as shown below:

Column 7, line 49, delete "MIMS" and replace with --MMS--.

Signed and Sealed this

Twenty-seventh Day of November, 2007

JON W. DUDAS
*Director of the United States Patent and Trademark Office*